United States Patent [19]

McDonald, Jr. et al.

[11] Patent Number: 5,417,930
[45] Date of Patent: May 23, 1995

[54] POLYMERIZATION REACTOR

[75] Inventors: Michael F. McDonald, Jr., Greenwell Springs, La.; David J. Lawrence, Brockenhurst; Donald a. Williams, Southampton, both of United Kingdom

[73] Assignee: Exxon Chemical Patents Inc., Wilmington, Del.

[21] Appl. No.: 263,498

[22] Filed: Jun. 21, 1994

Related U.S. Application Data

[63] Continuation of Ser. No. 57,196, May 4, 1993, abandoned, which is a continuation of Ser. No. 975,216, Nov. 12, 1992, abandoned, which is a continuation of Ser. No. 736,986, Jul. 29, 1991, abandoned.

[51] Int. Cl.$^6$ ................................................. C08F 2/00
[52] U.S. Cl. ........................................ 422/131; 366/98; 422/132; 422/135; 422/138
[58] Field of Search ............... 422/109, 132, 135, 138, 422/201, 227, 228, 131; 366/98

[56] References Cited

U.S. PATENT DOCUMENTS

| | | | |
|---|---|---|---|
| 1,795,588 | 3/1931 | Wilson . | |
| 2,474,592 | 6/1949 | Palmer | 260/85.3 |
| 2,536,603 | 1/1951 | Holmboe | 422/227 |
| 2,577,856 | 12/1951 | Nelson | 23/285 |
| 2,596,975 | 5/1952 | Bannon | 260/85.3 |
| 2,999,084 | 9/1961 | Arnold et al. | 260/85.3 |
| 3,040,013 | 6/1962 | Kuhn | 260/93.5 |
| 3,737,288 | 6/1973 | Hochman | 23/285 |
| 3,991,816 | 11/1976 | Klaren | 422/201 |
| 4,256,783 | 3/1981 | Takada et al. | 422/201 |
| 4,472,061 | 9/1984 | Mansour | 366/98 |

*Primary Examiner*—Timothy M. McMahon
*Attorney, Agent, or Firm*—Myron B. Kurtzman; Martha L. Gibbons; J. E. Schneider

[57] ABSTRACT

A novel chemical reactor: one particularly useful for the production of polymers, especially elastomers such as butyl rubber. The reactor contains (1) a two-tube pass system, constituted of an inner or center tube bundle through which a mixture or slurry of polymerizable monomers and catalyst is passed in one direction, and recycled via an outer tube bundle in the opposite direction in essentially even flow distribution, (2) while the tubes of the center and outer tubular bundles are maintained within a jacketed section, or sections of the reactor into which a coolant, or refrigerant, is injected and vaporized to remove the heat of reaction. The coolant, or refrigerant, in heat exchange relationship with the tubes removes the exothermic heats of reaction from the polymerization mixture, and maintains the polymerization mixture at uniformly low temperature. An even flow circulation of the slurry which aids in maintaining uniform low temperature, is provided by the use of (3) a diffuser and (4) mixed flow pumping system, with its impeller, by virtue of which an adequate pressure head of even pressure profile is developed across the entry sides of the center tubes to maintain the even flow distribution within the two-tube pass system at high circulation rate. There is no vortex whirl at the exit of the impeller-diffuser assembly, and no cavitation bubbles as commonly associated with one-tube pass systems, which employ a central draft tube and axial flow pump. Improved mixing, high hydraulic efficiency, and higher production rates with low polymer fouling, are achieved.

13 Claims, 3 Drawing Sheets

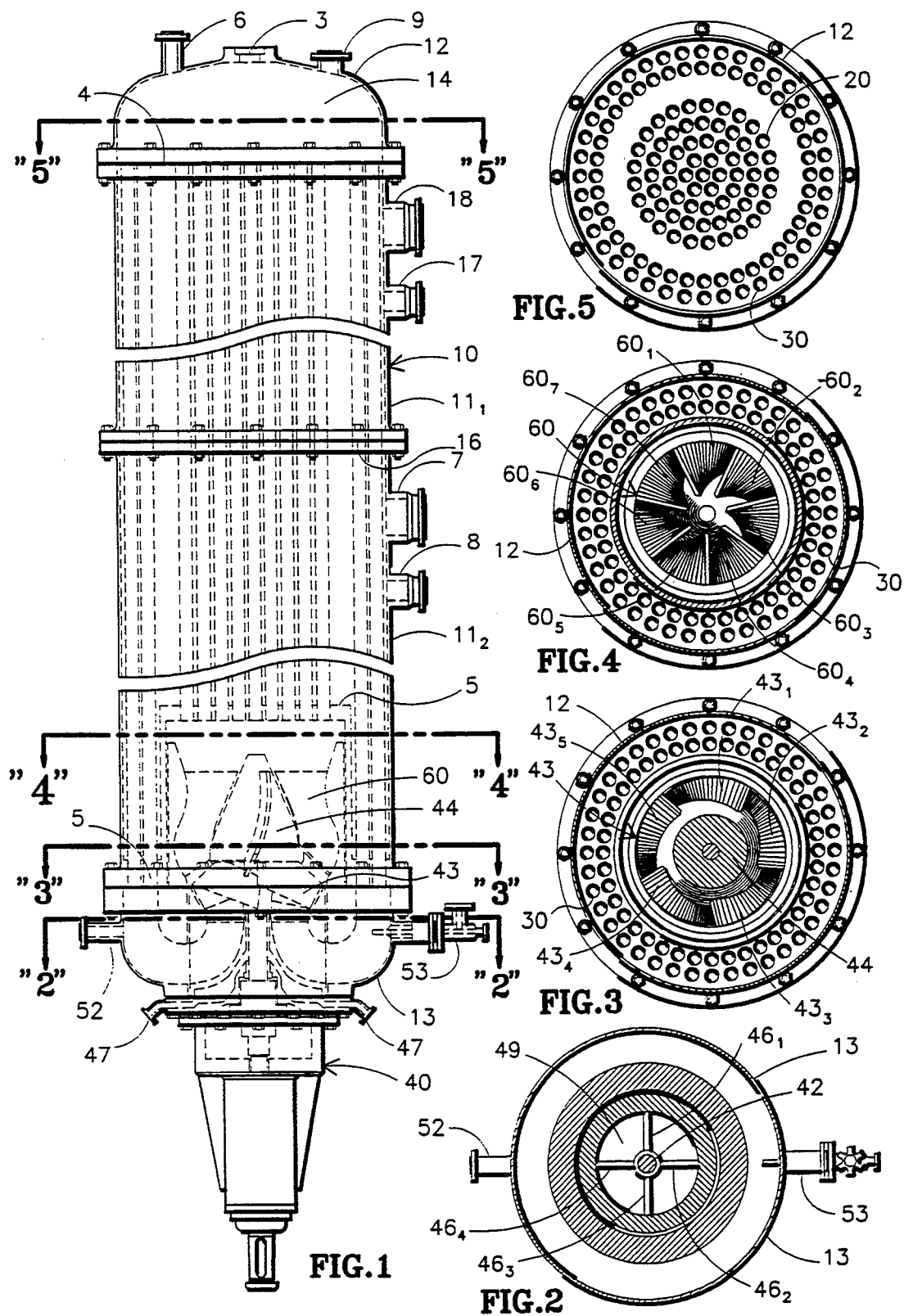

POLYMERIZATION REACTOR

This application is a continuation of U.S. application Ser. No. 08/057,196 filed May 4, 1993, now abandoned, which is a continuation of U.S. application Ser. No. 07/975,216 filed Nov. 12, 1992, now abandoned, which in turn is a continuation of U.S. application Ser. No. 07/736,986 filed Jul. 29, 1991, now abandoned.

BACKGROUND OF THE INVENTION

1. Field of the Invention

This invention relates to an improved chemical reactor, especially a polymerization reactor. In particular, it relates to a novel, improved back-mixed chemical reactor useful in the production of butyl rubber.

2. Background

Reactors are of various designs, the form and shape thereof depending largely on the nature of the reaction to be conducted therein. In conducting polymerization or condensation reactions where liquid chemical raw materials are catalytically converted into elastomeric solids or semi-solids, as in the production of synthetic rubber from low boiling hydrocarbons, a reaction mixture is circulated as a slurry in a reactor into which reactants and catalysts are injected, and product withdrawn. Where, e.g., isobutylene is polymerized with a diolefin in the presence of a Friedel-Crafts type catalyst, e.g., an aluminum halide catalyst, dissolved in a diluent of low freezing point, i.e., at temperatures of about $-100°$ F. to $-160°$ F. to produce butyl rubber, a back-mixed reactor is employed; typically a one-tube pass system as described by reference to U.S. Pat. No. 2,474,592. Such reactor is characterized generally as a vertically oriented elongate vessel formed by an enclosing side wall within which is provided an axially mounted draft tube of relatively large diameter surrounded by a relatively large number of small diameter tubes which extend downwardly from an upper common plane to a lower common plane where the upper and lower terminal ends of the small diameter tubes and draft tube, respectively, terminate. An axial flow pump, provided with a rotating impeller, which extends into the draft tube within which it is partially housed, is located in the bottom of the reactor to maintain the reaction mixture in a well dispersed state, and pump same up the draft tube; the reaction mixture including the diluent, catalyst, and reactants which are directly introduced into the bottom of the reactor, and a portion of the reaction mixture which after upward transport through the draft tube is recycled from the top of the reactor downwardly through the small diameter tubes which surround the draft tube. The outer walls of the reaction vessel form a jacket through which a liquid hydrocarbon coolant is circulated to remove the exothermic heat of reaction via heat exchange contact with the outer walls of the small diameter tubes, and wall of the central draft tube.

Whereas this reactor has been commercially used by the industry for many years for conducting these types of reactions, the reactor is nonetheless far less efficient than desirable. For example, vortex "whirl" at the impeller exit, or cavitation bubbles on the impeller, or both, impairs the hydraulic efficiency of the pump to a level of about fifty percent of that which is theoretically possible. This results in higher temperature surfaces throughout the reactor and increased heat duty for the reactor. For best operation, it is essential that the temperature of a butyl reactor, due to the high temperature sensitivity of the butyl polymerization process be maintained between about $-130°$ F. and $-145°$ F., and as uniform as possible.

Polymer fouling is another serious problem encountered in this type of reactor. Polymer deposits upon and fouls heat transfer surfaces within the reaction vessel; the polymer adhering tenaciously to the metal surfaces as a continuous film, and in severe cases as large masses of rubber. The reason, or reasons, for this phenomenon is not well understood though, it is known that mass fouling is caused by local overheating. Nonetheless, polymer fouling presents a serious problem and it has greatly limited the usefulness, as well as the efficiency of this type of reactor. For example, it is reported in U.S. Pat. No. 2,999,084 that "—Commercial experience has demonstrated that mass fouling is a limiting factor of prime importance with respect to the rate of production of tertiary isoolefin polymers in that fouling to an extent sufficient to inhibit adequate refrigeration will occur at erratic and unpredictable intervals within the range of about 10 to 90 hours"; and that "—When this happens, it is necessary to 'kill' the reaction medium and clean out the reactor before resuming the polymerization reaction," this normally requiring 10 to 20 hours. At its best, in any event, polymer fouling results in poor heat transfer, and loss of efficiency in the process operation. At its worse, the usefulness of the reactor is greatly curtailed.

For these reasons there presently exists a need for a new, novel, or improved reactor; particularly a reactor wherein the components of the reaction mixture are better dispersed, there is less polymer fouling of the reactor, and better hydraulic and thermal efficiency in the operation of the reactor.

OBJECTS

It is, accordingly, the primary objective of this invention to supply this need.

In particular, it is an object of this invention to provide a novel, better mixed and more hydraulically efficient reactor with reduced fouling tendency; one particularly useful for conducting polymerization reactions wherein liquid chemical raw materials are catalytically converted into polymeric solids or semi-solids, particularly elastomers.

A further and more specific object is to provide a reactor, as characterized, for catalytically polymerizing liquified isobutylene with a liquified diolefin at low temperatures to form a rubber-like polymer.

THE INVENTION

These objects and others are achieved in accordance with the present invention, embodying apparatus which comprises a vessel formed by an enclosing side, top and bottom wall, or walls, suitably an enclosing side wall, or walls, a top cover and bottom cover, with inlet and outlets for the introduction of reactants and catalysts, and the removal of product, within which is contained (1) a two-tube pass system, constituted of an inner or center tube bundle through which a mixture or slurry of polymerizable monomers and catalyst is passed in one direction, and recycled via an outer tube bundle in the opposite direction in essentially even flow distribution, (2) while the tubes of the center and outer tubular bundles are maintained within a jacketed section, or sections of the reactor into which a coolant, or refrigerant, is injected and vaporized to remove the heat of reaction.

The coolant, or refrigerant, in heat exchange relationship with the tubes thus removes the exothermic heat of reaction from the polymerization mixture, and maintains the polymerization mixture at uniformly low temperature. An even flow circulation of the slurry, which aids in maintaining the uniform low temperature, is provided by the use of (3) a diffuser and (4) mixed flow pumping system, with its impeller, by virtue of which an adequate pressure head of even pressure profile is developed across the entry sides of the center tubes to maintain the even flow distribution within the two-tube pass system at high circulation rate. There is no vortex whirl at the exit of the impeller-diffuser assembly, and no cavitation bubbles as commonly associated with one-tube pass systems, which employ a central draft tube and axial flow pump. Improved mixing, high hydraulic efficiency, and higher production rates with low polymer fouling, are achieved.

The invention, and its principle of operation, will be more fully understood by reference to the following detailed description of a specific and preferred embodiment, and to the attached drawing to which reference is made in the description. The various features and components in the drawing are referred to by numbers, similar features and components in the different views being represented by similar numbers. Where a subscript is used with a number, the latter is to be taken in a generic sense, the subscripts being used to indicate that the specific unit referred to is constituted of more than one similar component.

BRIEF DESCRIPTION OF THE DRAWINGS

In the drawing:

FIG. 1 depicts a sectional side elevation view of a polymerization reactor.

FIG. 2 is a section view taken along line 2—2 of FIG. 1.

FIG. 3 is a section view taken along line 3—3 of FIG. 1.

FIG. 4 is a section view taken along line 4—4 of FIG. 1.

FIG. 5 is a section view taken along line 5—5 of FIG. 1.

Referring to FIG. 1 there is shown a polymerization reactor 10 of a vessel formed by an enclosing side wall 11, formed of upper and lower tubular sections $11^1$, $11^2$, respectively, bolted or welded together to form a tubular shell, an enclosing top cover 12 and bottom cover 13 each of which is provided with inlets or outlets, or both, as subsequently described for the introduction or withdrawal of catalyst, chemical raw materials or products.

Figure 6:
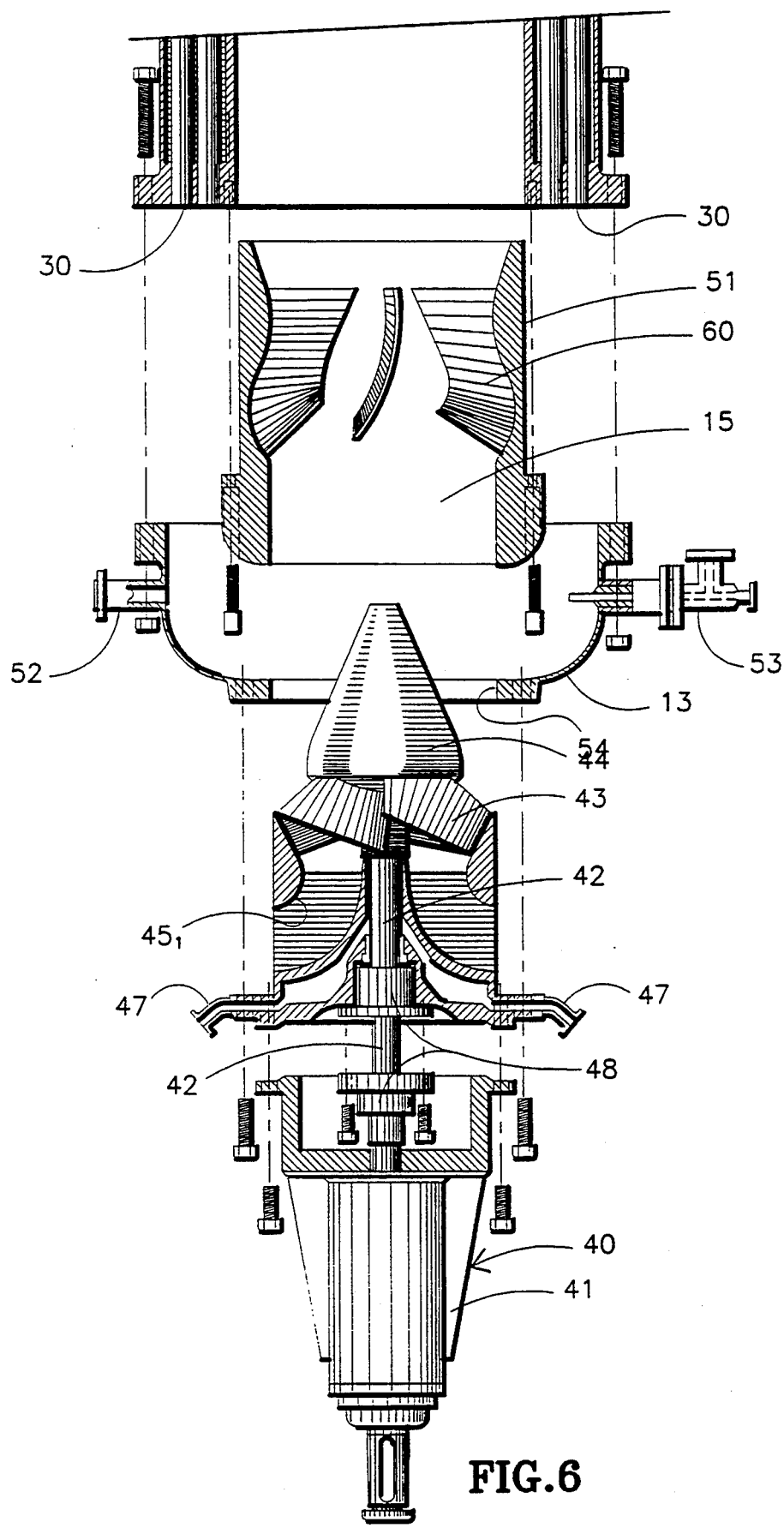
FIG. 6 is an enlarged, exploded view of the lower portion of the reactor depicted by reference to FIG. 1.

A first tube bundle 20 is located at the center of the vessel, the central tube bundle 20 containing a large number (n) of tubes $20_1$, $20_2$–$20_n$ oriented axially to the shell, and arrayed in a convenient pattern (e.g., as a triangle, square, or circular pattern as shown), within the enclosing side wall 11 of the vessel; and the first, or central tube bundle 20 is surrounded by a second tube bundle 30 containing a large number (n) of $30_1$, $30_2$–$30_n$ oriented axially to the shell and arranged in circular array (FIG. 5). The terminal ends of the tubes of tube bundles 20, 30 extend downwardly from an upper common plane, above which there is provided an enclosed upper reactor space, reactor head or chamber 14, to a lower common plane, below which there is provided a lower reactor space, reactor head or bottom chamber 15 (FIG. 6). A mixed flow pump assembly 40 is mounted in the bottom chamber of the vessel, the "impeller" or "pumping end" of the pump being faced upwardly so that a liquid, or slurry, can be pumped upwardly into a passageway of circuitous shape, or design, containing a diffuser 60 which directs the liquid flow into the tubes $20_1$, $20_2$–$20_n$ of the central tube bundle 20. The liquid, or slurry, after upward passage through tubes $20_1$, $20_2$–$20_n$ exits into the upper chamber 14, and a major portion thereof is then recycled, or passed downwardly through the tubes $30_2$, $30_2$–$30_n$ of tube bundle 30 and returned to bottom chamber 15. The vessel is jacketed and provided with an inlet, or inlets, for the introduction of a coolant, or refrigerant, suitably a liquid coolant, or refrigerant, and an outlet, or outlets, for the removal of the coolant, or refrigerant, suitably as a vapor-liquid mixture to more effectively remove the exothermic heat of reaction.

The amount of surface area provided by each of the two tubular bundles for heat exchange ranges generally from about 250 ft$^2$ to about 4,000 ft$^2$, preferably from about 1,500 ft$^2$ to about 2,000 ft$^2$. Preferably, in a given installation the total heat exchange capacity provided by the central tube bundle ranges from about 3:1 to about 0.33:1, preferably from about 1.2:1 to about 0.8:1 of that provided by the outer tube bundle; and most preferably approximates the heat exchange capacity provided by the outer tube bundle. Suitably the number, size and composition of the tubes of the central tube bundle is the same as or approximates that of the outer tube bundle.

The central tube bundle 20 generally contains from about 20 to about 800 individual tubes of internal diameter ranging from about 1 inch to about 6 inches, preferably from about 30 to about 400 individual tubes of internal diameter ranging from about 2 inches to about 4 inches. The outer tube bundle 30 generally contains from about 20 to about 800 individual tubes of internal diameter ranging from about 1 inch to about 6 inches, preferably from about 30 to about 400 individual tubes of internal diameter ranging from about 2 inches to about 4 inches. An arrangement of about 85 stainless steel tubes having an internal diameter of about 3 inches in the central tube bundle, and an outer tube bundle of about 85 stainless tubes having an internal diameter of about 3 inches, e.g., proves quite satisfactory. Liquid, or slurry, will flow at high rates far more uniformly upwardly through the tubes of the central tube bundle 20, and at high rates far more uniformly downwardly through the tubes of the outer tube bundle 30 than possible by means of a single draft tube of relatively large diameter as employed in an existing reaction design. Moreover, the large number of tubes located at the center of the reactor enables the removal of the exothermic heats of reaction far more efficiently than a central draft tube as in an existing reactor design. A very uniform, and constant temperature can be maintained throughout the reacting mixture. Generally, with this arrangement, the temperature variation will be no greater than about 1° F., and typically the temperature variation will be less than about 1° F.

For convenience, because of the length of the reactor 10, the shell 11 of the reactor is fabricated in a plurality of sections, generally in two parts $11_1$, $11_2$ bolted or welded one to the other. Likewise, for convenience, the jacket of the reactor 10 is generally comprised of a plurality of sections, in this case an upper section and a lower section. Thus, the shell 11 is formed into two parts 11₁, 11₂, bolted or welded one part to the other and separated by an internal baffle, or partition 16, through which the tubes of tube bundles 20, 30 are extended. The opposite ends of the two internal sections of the reactor 10 are closed by an upper closure member, or plate 4, and a lower closure member, or plate 5. A unique feature of this reactor is that it utilizes a cooling jacket, or a plurality of jacket sections to force full boiling of the coolant in the jackets, and at the same time force nearly equal heat transfer rates in each of the jackets, providing optimum heat transfer performance.

In a conventional commercial butyl reactor, the reactor jackets are chilled by thermosyphoning liquid ethylene from a single head drum above the jackets to the bottom of each of the jackets, and taking vapor and liquid from the top of the jackets back to the head drum. This technique induces a rapid circulation rate of cold liquid from the head drum to the jackets and back again. The impact of this high liquid rate is two-fold. First, a low or non-boiling zone is set up at the lower portion of each jacket where the heat transfer coefficient is over one order of magnitude lower than for full boiling heat transfer. Second, the large quantity of subcooled ethylene entering the jacket increases the density of liquid and vapor in the jackets, raising the average boiling temperature of the ethylene in the jackets. Because the bottom jacket is much lower in elevation than the top jacket (therefore having a much larger subcooled non-boiling zone), a much larger percentage of heat is transferred by the top jacket.

The situation can be improved by providing two head drums at different elevations so that the degree of subcooling of the refrigerant, e.g., ethylene, at the entry point at the bottom of the jackets is essentially equivalent. This however requires additional equipment which still leaves the jacket with a non-boiling zone at the bottom. The subcooled ethylene must be heated to the boiling point by the slurry with low heat transfer coefficient.

In the reactor of this invention, this problem is solved by feeding the fresh coolant, i.e., fresh ethylene liquid, to the reactor system via inlet 8 to the top of the bottom jacket, and feeding liquid from a single head drum (not shown) via inlet 17 to the top of the top jacket (via a throttling control valve). The fresh liquid coolant is heated to its boiling point as it descends through the vapor-liquid froth in the jacket. As a result both jackets operate in full boiling heat transfer, and the liquid rate is controlled to the top jacket to establish the same froth density in both the top and bottom jackets. This in effect provides the best overall heat transfer coefficient and the lowest possible average coolant temperature in the two jackets.

Fresh coolant, e.g., liquid ethylene, is thus introduced into the lower jacket, or lower compartmented section of the reactor via one or more inlets, e.g., inlet 8, and removed therefrom via one or more outlets, e.g., outlet 7. Coolant from a head drum is fed into the top jacket via one or more inlets, e.g., inlet 17, and removed therefrom via one or more outlets, e.g., outlet 18. The top cover 12, which is bolted to the upper side of the shell 11, is provided with a product, or slurry outlet 9, one or more thermowells, e.g., a thermowell 6, and safety valve nozzle 3. A portion of the liquid, or slurry, from upper chamber 14 is removed via outlet 9 as product, and a portion recycled to lower chamber 15 via passage through the tubes of the outer tube bundle 30. Coolant introduced into the jacketed portions of the vessel contacts the outer walls of the tubes of tube bundles 20, 30 to absorb the heat of reaction, the coolant exiting the jackets via outlets 7, 18.

The two-pass reactor design, or design created via the use of two tube bundles, provides considerably more heat transfer area than previous designs utilizing a draft tube (more than double), the additional surface allowing operation at a much lower heat flux, thereby reducing the temperature gradient across the tubes. This results in a more uniform, cooler slurry temperature, which reduces polymer fouling rate. With the mixed flow pump and diffuser design, the slurry can also be circulated at a high rate (40% to 50% greater than that of the conventional reactor utilizing a draft tube and axial flow impeller), this increasing the amount of shear applied to the slurry; this effect also reducing the polymer fouling rate. Thus, because polymer slurries are non-Newtonian, and thin with increasing shear, the higher circulation rate results in a lower slurry viscosity and a higher slurry side heat transfer coefficient. Due to the improved heat transfer capability produced by the higher circulation rate, slurry temperature is reduced and the polymer fouling rate significantly lowered.

In the reactor 10, the velocity of the liquid, or slurry, will drop only slightly, e.g., about 45 percent, of the tube velocity when the liquid, or slurry, enters into a reactor head, i.e., chamber 14, 15. This compares to about a 70 to 75% drop in the conventional draft tube design. This further reduces the propensity for mass fouling as commonly observed within these zones in conventional reactors.

The bottom, or central bottom chamber 15 houses a passageway of circuitous shape, or design, a mixed flow pump assembly 40 and a diffuser 60, the impeller end of which is projected upwardly into the passageway. Referring for convenience first to FIG. 6, it will be observed that the bottom cover 13, which in this view is removed from reactor 10, is secured thereto via bolt connections. A centrally located vertically oriented projection, or nozzle 51 of generally tubular design is bolted to the tubesheet 30, and removable therefrom. Upon, and affixed via an edge to the inside wall of the axial opening through the nozzle 51 there is circumferentially arrayed a plurality of vanes—in this instance seven (7); 60₁, 60₂, 60₃, 60₄, 60₅, 60₆, 60₇—constituting a diffuser 60; also depicted by reference to FIG. 4. Each of the vanes in its vertical orientation is angled and shaped, and each is separated or spaced apart one from another over the cross-section of the passageway within which they are contained to redirect or change the direction of flow of a liquid, or slurry, impinged thereupon to a vertically upward, and substantially linearly direction over the area defined by the bottom cross-section of the tubes of tube bundle 20. The bottom cover 13 is also provided with one or more thermowell nozzles, e.g., a thermowell nozzle 52, one or moe catalyst inlets, e.g., a catalyst inlet 53, and large bottom opening 54 within which the impeller end of the mixed flow pump 40 can be projected; and a plurality of flange openings by virtue of which both the cover and pump can be bolted in place.

Continuing the reference to FIG. 6, for convenience, the mixed flow pump 40 is constituted of a bearing housing 41, a connecting drive shaft 42, an impeller 43 mounted to the upper end of the drive shaft, and a nose cone 44 of conical shape, the apex of which is faced upwardly. The lower portion of the impeller 43 and drive shaft 42 are contained within a housing 45 of tubular shape, the upper inside portion of the tube being provided with a circumferential inwardly bulged ridge $45_1$, guide support members $46_1$, $46_2$, $46_3$, $46_4$ and openings 49. Feed inlet passages 47 provide a means for the introduction of feed to the reactor, and a pump seal 48 is provided at the location wherein the drive shaft 42 connects through bearing housing 41 with motor drive shaft and motor, not shown.

Figure 7:
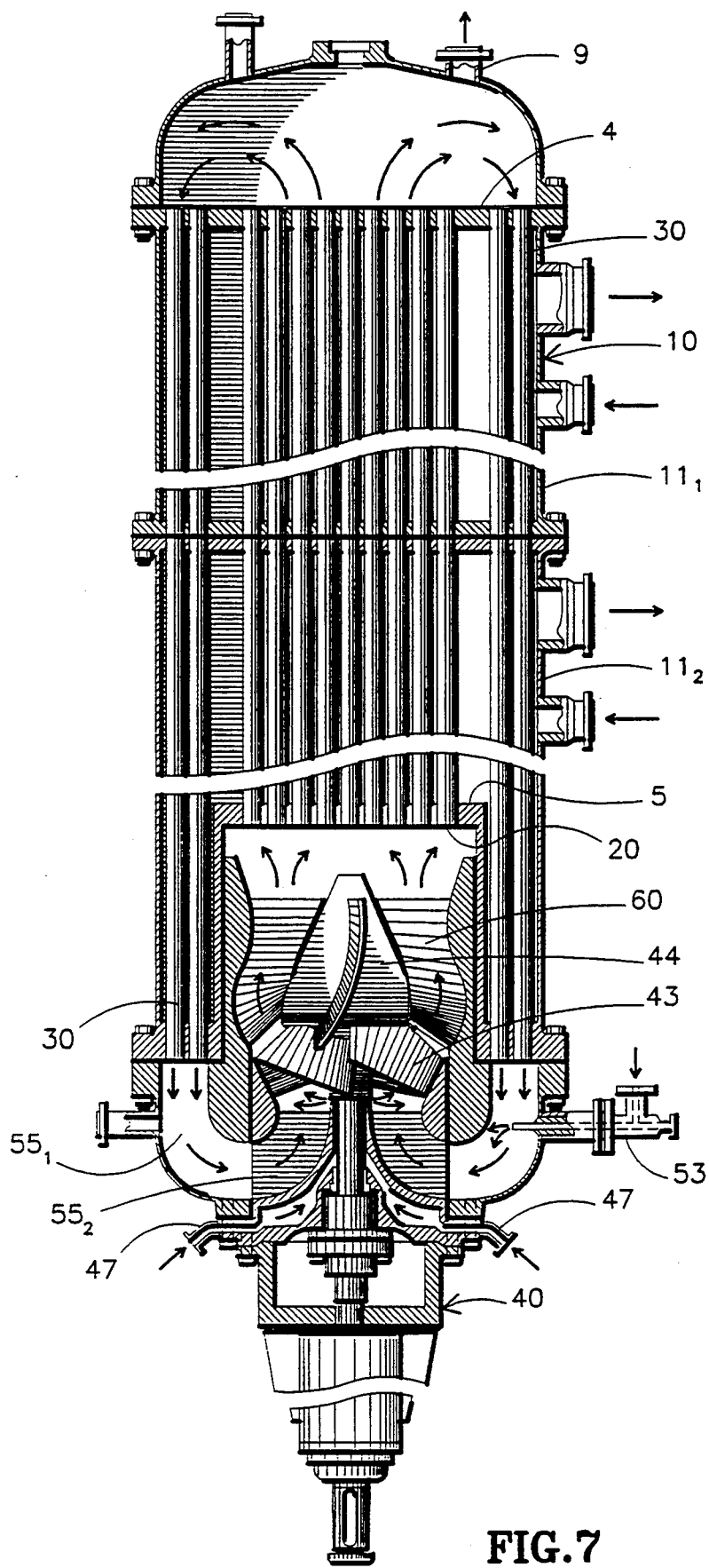
FIG. 7 is an enlarged assembled view of the reactor described in FIG. 1.

The impeller 43, as best shown by reference to FIG. 3, is constituted of a plurality of blades—in this instance five (5); $43_1$, $43_2$, $43_3$, $43_4$, $43_5$—circumferentially, evenly spaced apart and located near the upper terminal end of the shaft 42. The blades 43 are peripherally mounted and arrayed about an expanded base section of cone 44 located upon the upper end of the shaft 42. A diffuser cone, or nose cone 44 rests upon, and is affixed to the expanded base section. Activation of the motor (not shown) rotates the drive shaft 42, the impeller 43, and nose cone 44. In place, the mixed flow pump assembly 40, as shown 5 e.g., by reference to FIG. 7, provides a continuous channel in which the slurry, or reaction mixture is received and propelled upwardly by action of the impeller blades 43. The arrangement, and location of the pump assembly 40, notably the impeller 43 and nose cone 44, the diffuser 60, and contour of the channel is such as to eliminate void spaces, this in effect reducing if not altogether eliminating polymer fouling in this zone.

In operation, referring specifically to FIG. 7, a catalyst is introduced into the reactor 10 via inlet 53. Hydrocarbon feed and diluent are introduced into the reactor 10 via inlets 47, the feed entering into the reactor through a "feed slot" area bounded on the upper side by the lower face of the rotating impeller 43 and on the lower side by the bottom cover, or suction cover 13 creating in effect a "mole hill." The reactant hydrocarbons and diluent, after chilling, are brought via cavities 40 and tubes through the cover 13 to the feed slot area, this permitting low pressure drop and improved cooling as the fluid flows through the annular space around the shaft to the feed slot area. Recycle slurry descends through the tubes of tube bundle 30 passing around and then upwardly via openings $55_1$, $55_2$ to pick up and admix with the feed and diluent in the feed slot area; and catalyst introduced into the reactor via one or a plurality of inlets, e.g., inlet 53. Slurry is picked up at the feed slot area by the rotating blades of impeller 43 and forced upwardly, the liquid exiting, or leaving the mixed flow impeller 43 at an angle inclined away from the axis of rotation. The angle of flow is, of course, distinctly different from that of an axial flow impeller, as conventionally used, and this type of flow produces a greater pressure head. The direction of flow, on exiting the impeller, is altered by the vanes of the diffuser 60 which redirects, or turns the flow of liquid back toward the axis of rotation, and stops the spinning flow, or vortex whirl, which normally occurs at the impeller discharge. Thus, the mixed flow pump initially pumps the liquid at an angle away from a straight line drawn through the impeller inlet and point of discharge to the tubes of tube bundle 20, i.e., at an angle greater than 0°, generally from about 5° to about 75°, and the flow is then redirected by the diffuser 60 such that the net effect is that it is essentially axially ejected on discharge to the tube bundle 20. The slurry is pumped upwardly through tubes 20 at high rates in a far more even flow distribution, and there is no cavitation on the impeller blades, or essentially no cavitation at process conditions.

By mounting and integrating the nose cone 44 with the rotating impeller 43 stagnant zones are eliminated with the result that polymer fouling is virtually eliminated. In previous designs, where a nose cone is mounted on the diffuser rather than the impeller this is not the case, and stagnant zones give rise to polymer fouling; this eventually restricting circulation and pump impeller movement which causes the pump to overload and/or seize. A surprising and unexpected additional benefit due to the presence of the rotating nose cone 44 is that hydraulic efficiency is increased, and there is an enhancement in the mixing of feed and catalyst in the area of the impeller. The arrangement of the impeller 43 and diffuser 60 eliminates vortex whirl at the impeller-diffuser outlet, this in itself greatly increasing the hydraulic efficiency of the system, i.e., from about 50% to about 80%. This increase in hydraulic efficiency is particularly important since increased hydraulic efficiency lowers pump heat input to the slurry for a given circulation rate, and decreases the heat duty for the reactor.

The use of a mixed flow impeller design is of particular importance in combination with the two tube pass system, providing a high pump pressure head, with the development of a high circulation rate. The circulation rate developed is at least 50% greater than that of which an axial flow type pump is capable, at the required pressure head. The mixed flow pump performance is matched to the hydraulic characteristics of the vessel to obtain the desired circulation rate and to essentially completely eliminate the cavitation bubbles at the impeller, as is normally associated with the impeller designs employed in conventional reactors. This is accomplished in part by rotation of an impeller, e.g., of diameter ranging from about 1 foot to about 4 feet, at specific speeds, $N_s$, ranging from about 2,000 to 10,000, where $$N_s = \frac{N\sqrt{Q}}{H^{\frac{3}{4}}};$$

and wherein N=speed (RPM), Q=flow (GPM) and H=head (feet); typical speeds ranging from about 200 rpm to about 1000 rpm; matching the blade angles of the impeller to the fluid velocity and velocity of impeller rotation so that the resultant velocity vector and the blade angles are the same. The surprising and unexpected benefit of totally eliminating the cavitation bubbles on the impeller is to provide a significant reduction in the viscosity of the rubber slurry, and thus a slower warmup rate of the reactor because of a higher slurry side heat transfer coefficient. Cavitation at the impeller causes dissolved inert gases to be pulled from the solution to form a separate bubble phase in the reactor. The bubble phase increases the viscosity of the reactor slurry.

The vessel herein described can be effectively used to carry out any process for conducting polymerization or condensation reactions where liquid chemical feeds are catalytically converted into polymeric solids, semi-solids, or liquids, especially elastomers, and particularly elastomers as produced in a butyl polymerization process, i.e., a reaction wherein isobutylene is polymerized with a diolefin in the presence of a Friedel-Crafts catalyst at low temperature to produce butyl rubber. It can provide (1) excellent mixing of feeds and catalyst into a circulating reacting mixture, (2) highly uniform circulating fluid temperature, and constant temperature, throughout the reacting mixture, (3) excellent heat removal from the circulating fluid, and (4) ability to handle fouling slurries without a rapid loss in performance. These effects can be provided at high production rates, with low fouling.

It is apparent that various modifications and changes can be made without departing the spirit and scope of the invention.

What is claimed is:

1. In reactor apparatus for catalytically converting liquid reactants to polymeric solids, semisolids, or liquids, wherein there is included a vessel formed by an enclosing side wall, top and bottom cover and inlet and outlets for the introduction of liquid reactants and catalyst, and the removal of product from the vessel, a improved combination which comprises two tube bundles
  a central tube bundle constituted of a plurality of individual tubes vertically aligned one with respect to another, and arrayed about the major, central axis of the reactor,
  a tube bundle constituted of a plurality of individual tubes vertically aligned one with respect to another, and with respect to the tubes of the central tube bundle, arranged in circular array and
surrounding said central tube bundle, the tube lengths of which extend from a level where the ends of the tubes terminate below the top cover of the vessel, to a location above the bottom of the vessel to leave a central bottom chamber,
a diffuser constituted of a plurality of spaced apart vanes of circuitous shape circumferentially affixed via an edge upon the inside wall of a tubular projection and spaced apart to leave a central opening, the tubular projection being supported above the bottom cover of the vessel and extending into the central bottom chamber of said vessel,
a mixed flow pump assembly, which includes
  a nose cone of conical shape,
  a drive shaft to the upper terminal end of which the base portion of said nose cone is affixed while the apex of the nose cone is directed upwardly,
  an impeller constituted of a plurality of blades of circuitous shape affixed via an edge and circumferentially arrayed upon the shaft below the nose cone, and
  a motor means for rotating said drive shaft, impeller, and nose cone as a unit,
the nose cone portion of the mixed flow pump assembly being positioned upwardly, and projected into the central opening formed by the blades of the diffuser providing a passageway such that on activation of the motor means to produce rotation of the impeller a slurry of the liquid reactants and catalyst introduced into the reactor will be picked up by the rotating blades of the impeller, forced upwardly, and outwardly at an angle inclined away from the axis of impeller rotation, and then on passing through the diffuser the direction of movement of the slurry is turned and redirected back toward the axis of impeller rotation, the net effect of which is that the slurry is transported continuously upwardly and essentially axially ejected on discharge from the diffuser to the bottom terminal tube ends of the central tube bundle in an essentially even flow distribution, passed upwardly through the tubes of the central tube bundle, a portion of the slurry is removed from the reactor as product, and a portion thereof is returned via the tubes of the surrounding tube bundle to the central bottom chamber as recycle to the reactor.

2. The apparatus of claim 1 wherein the reactor is jacketed, sections of the tubes of the two tubular bundles being partitioned off from their terminal ends, with inlet and outlets in the reactor wall for the introduction of a coolant into the jacketed section of the reactor.

3. The apparatus of claim 2 wherein the upper portion of the jacket is provided with an inlet for the introduction of the coolant as a liquid and an outlet in the upper portion of the jacket for removal of the coolant as both liquid and gas phases, full boiling of the coolant being maintained throughout the jacket.

4. The apparatus of claim 2 wherein the jacketed portion of the reactor is divided into two or more adjacent sections.

5. The apparatus of claim 2 wherein the jacketed portion of the reactor is divided into two or more adjacent portions, inlets being provided in the upper portion of each of the jacketed sections for the introduction of coolant, outlets in the upper portion of each of the jacketed sections for removal of coolant, while controlling the liquid flow to the top portions of each of the jackets to maintain the same froth density in each of the jacketed portions of the reactor.

6. In reactor apparatus for catalytically converting liquid reactants to polymeric solids, semisolids, or liquids wherein is included an elongate vessel formed by an enclosing side wall, top and bottom cover and inlet and outlets for the introduction of liquid reactants and catalyst, and the removal of product from the vessel, a combination comprising two tube bundles,
  a central tube bundle constituted of
    a plurality of individual tubes vertically aligned one with respect to another, and arrayed about the central axis of the reactor,
  a tube bundle constituted of a plurality of individual tubes vertically aligned one with respect to another, and with respect to the tubes of the central tube bundle, arranged in circular array and
surrounding said central tube bundle the tube lengths of the tube bundles of which extend downwardly from an upper reactor chamber to a bottom reactor chamber,
a reactor jacket formed within the enclosing side wall of the reactor via partitioning closure plates located below the terminal upper ends, and above the terminal lower ends, respectively, of the tubes of the two tube bundles, including an inlet for the introduction of a liquid coolant, and outlet for the removal of coolant liquid, vapor, or both liquid and vapor,
a diffuser constituted of a plurality of spaced apart vanes of circuitous shape circumferentially affixed via an edge upon the inside wall of a tubular projection and spaced apart to leave a central opening, the tubular projection being supported upon the bottom cover of the vessel and extending into the central bottom chamber of said vessel, a mixed flow pump assembly, which includes
  a nose cone of conical shape, a drive shaft to the upper terminal end of which the base portion of said nose cone is affixed while the apex of the nose cone is directed upwardly, an impeller constituted of a plurality of blades of circuitous shape affixed via an edge and circumferentially arrayed upon the shaft below the nose cone, and a motor means for rotating said drive shaft, impeller, and nose cone as a unit, the nose cone portion of the mixed flow pump assembly being positioned upwardly, and projected into the central opening formed by the blades of the diffuser providing a passageway such that on activation of the motor means to produce rotation of the impeller a slurry of the liquid reactants and catalyst introduced into the reactor will be picked up by the rotating blades of the impeller, forced upwardly, and outwardly at an angle inclined away from the axis of impeller rotation, and then on passing through the diffuser the direction of movement of the slurry is turned and redirected back toward the axis of impeller rotation, the net effect of which is that the slurry is transported continuously upwardly and essentially axially ejected on discharge from the diffuser to the bottom terminal tube ends of the central tube bundle in an essentially even flow distribution, passed upwardly through the tubes of the central tube bundle, a portion of the slurry is removed from the reactor as product, and a portion thereof is returned via the tubes of the surrounding tube bundle to the central bottom chamber as recycle to the reactor.

7. The apparatus of claim 6 wherein the central tube bundle contains from about 20 to about 800 tubes, each of internal diameter ranging from about 1 inch to about 6 inches, providing a heat exchange surface area ranging from about 250 ft$^2$ to about 4000 ft$^2$, and the outer tube bundle contains from about 20 to about 800 tubes, each of internal diameter ranging from about 1 inch to about 6 inches, providing a heat exchange surface area ranging from about 250 ft$^2$ to about 4000 ft$^2$.

8. The apparatus of claim 7 wherein the central tube bundle contains from about 30 to about 400 tubes, each of internal diameter ranging from about 2 inches to about 4 inches, providing a heat exchange surface area ranging from about 1,500 ft$^2$ to about 2,000 ft$^2$, and the outer tube bundle contains from about 30 to about 400 tubes, each of internal diameter ranging from about 2 inches to about 4 inches, providing a heat exchange surface ranging from about 1,500 ft$^2$ to about 2,000 ft$^2$.

9. The apparatus of claim 6 wherein the liquid reactant is introduced into a feed slot area bounded on the upper side by the lower face of the impeller and on the lower side by a bottom cover of the reactor, the liquid reactant after chilling being brought by cavities and tubes through said cover to a feed slot area, providing feed inlets from the reactor exterior to a location just below the impeller, this permitting low pressure drop and improved cooling as the fluid flows through an annular space around the shaft to the feed slot area.

10. The apparatus of claim 6 wherein the reactor jacket is formed in a plurality of adjacent sections separated one from another via a partitioning closure plate, and each of the jacket sections is provided with an upper inlet to which a liquid coolant can be supplied, and outlet for the removal of coolant liquid, vapor, or both liquid and vapor.

11. The apparatus of claim 10 wherein the reactor jacket is formed in two adjacent sections each provided with an upper inlet, and outlet.

12. The apparatus of claim 6 wherein the upper portion of the jacket is provided with an inlet for the introduction of the coolant as a liquid and an outlet in the upper portion of the jacket for removal of the coolant as both liquid and gas phases, full boiling of the coolant being maintained throughout the jacket.

13. The apparatus of claim 6 wherein the jacketed portion of the reactor is divided into two adjacent portions, inlets being provided in the upper portion of each of the two jacketed sections for the introduction of coolant, outlets in the upper portion of each of the two jacketed sections for removal of coolant, with means for controlling the liquid flow to the top portions of each of the two jackets to maintain the same froth density in each of the two jacketed portions of the reactor.

* * * * *